United States Patent
D'Ambrosio

(10) Patent No.: US 9,372,774 B2
(45) Date of Patent: Jun. 21, 2016

(54) REDUNDANT COMPUTING ARCHITECTURE

(71) Applicant: GM GLOBAL TECHNOLOGY OPERATIONS LLC, Detroit, MI (US)

(72) Inventor: Joseph G. D'Ambrosio, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 424 days.

(21) Appl. No.: 13/899,941

(22) Filed: May 22, 2013

(65) Prior Publication Data

US 2014/0351658 A1 Nov. 27, 2014

(51) Int. Cl.
*G06F 11/30* (2006.01)
*G06F 11/16* (2006.01)
*G06F 11/20* (2006.01)

(52) U.S. Cl.
CPC .......... *G06F 11/3055* (2013.01); *G06F 11/165* (2013.01); *G06F 11/1641* (2013.01); *G06F 11/2025* (2013.01); *G06F 11/2038* (2013.01); *G06F 11/2043* (2013.01)

(58) Field of Classification Search
CPC .............. G06F 11/1641; G06F 11/165; G06F 11/2025; G06F 11/2038; G06F 11/2043
See application file for complete search history.

(56) References Cited

U.S. PATENT DOCUMENTS

| 2001/0011314 A1* | 8/2001 | Gallagher | G06F 13/4081 710/302 |
| 2005/0123036 A1* | 6/2005 | Rahman | H03H 11/1291 375/240 |
| 2007/0164168 A1* | 7/2007 | Hirvonen | B64C 13/04 244/223 |
| 2010/0253512 A1* | 10/2010 | Wagner et al. | 340/540 |

FOREIGN PATENT DOCUMENTS

| CN | 1553346 A | 12/2004 |
| CN | 102822807 A | 12/2012 |

* cited by examiner

*Primary Examiner* — Jigar Patel
(74) *Attorney, Agent, or Firm* — Quinn Law Group, PLLC

(57) ABSTRACT

A redundant computing architecture includes a first control unit, a second control unit, and a switch. The first control unit is configured to provide a first control signal in response to a sensory input and is further configured to provide a health status indicator that is indicative of a fault condition within the first control unit. Additionally, the second control unit is configured to provide a second control signal in response to the sensory input. Each of the first and second control signals is respectively operative to control an actuator. The switch is configured to: receive the health status indicator, the first control signal, and second control signal; provide the first control signal to the actuator if this health status indicator does not indicate a fault: and provide the second control signal to the actuator if this health status indicator does indicate a fault.

8 Claims, 2 Drawing Sheets

REDUNDANT COMPUTING ARCHITECTURE

TECHNICAL FIELD

The present invention relates to a redundant computing architecture for electronic actuator control.

BACKGROUND

As computer systems continue to provide an increasingly significant function in daily life, it has become important that the computer architecture design contemplates unexpected hardware and/or software behavior and takes affirmative precautions to prevent such behavior from causing a more severe problem. These precautions may include the use of redundancy to provide a secondary/backup operating mode. Traditional methods of merely disabling or resetting the system may be inadequate if the greater system is in a vulnerable state that requires a certain amount of continued control to mitigate existing risks.

SUMMARY

A redundant computing architecture includes a first control unit, a second control unit, and a switch that cooperate to control the operation of an actuator. The first control unit includes a first processing device configured to provide a first control signal in response to a sensory input, and a diagnostic device configured to provide a health status indicator in response to the operation of the first processing device. The first control signal is an operative to control an actuator, while the health status indicator is indicative of a fault (or lack thereof) within the first processing device.

The second control unit includes a second processing device that is configured to provide a second control signal in response to the sensory input. Similar to the first control signal, the second control signal is also operative to control the actuator. The switch is configured to receive health status indicator, the first control signal, and second control signal, and to provide a master control signal to the actuator. The switch is generally configured to provide the first control signal as the master control signal if the health status indicator does not indicate a fault within the first control unit. Conversely, if the health status indicator does indicate a fault, the switch may provide the second control signal as the master control signal.

The first control signal may generally define a first magnitude, and the second control signal may generally define a second magnitude. The switch may be further configured to determine an absolute difference between the first magnitude and the second magnitude, compare the absolute difference to a threshold, and provide an indicator if the absolute difference exceeds the threshold. The same indicator may also be provided if the health status indicator indicates a fault within the first control unit.

In one configuration, the indicator may include a limited operation signal provided to each of the first control unit and the second control unit. The limited operation signal may prevent further operation of both the first control unit and the second control unit following a predefined event, such as the architecture being placed in a physically stationary state, or disabling the computing architecture. In this manner, the computing architecture may maintain its integrity until the architecture is in an appropriate place to discontinue further use of the actuator. Additionally, the indicator may include a warning light to indicate to a user that the architecture is operating under limited operation and/or that a fault has occurred.

In a similar manner, a method of controlling an actuator may include: providing a first actuator control signal and a health status indicator from a first control unit to a switch; providing a second actuator control signal from a second control unit to the switch; and providing a master control signal from the switch to the actuator. The master control signal may include the first actuator control signal if the health status indicator does not indicate a fault condition; and the master control signal may include the second actuator control signal if the health status indicator does indicate a fault condition.

Additionally, the method may include determining an absolute difference between a magnitude of the first actuator control signal and a magnitude of the second actuator control signal; comparing the absolute difference to a threshold; and providing a limited operation signal from the switch to each of the first control unit and the second control unit if the health status indicator indicates a fault or if the absolute difference exceeds the threshold.

The above features and advantages and other features and advantages of the present invention are readily apparent from the following detailed description of the best modes for carrying out the invention when taken in connection with the accompanying drawings.

DETAILED DESCRIPTION

Figure 1:
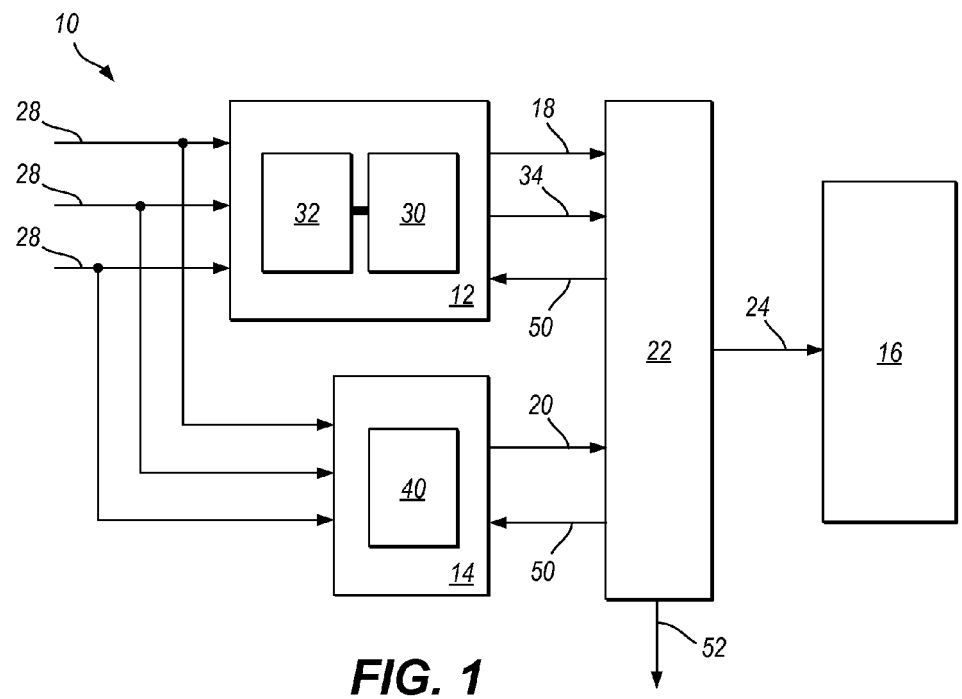
FIG. 1 is a schematic diagram of a first embodiment of a redundant computing architecture for controlling an actuator.

Referring to the drawings, wherein like reference numerals are used to identify like or identical components in the various views, FIG. 1 schematically illustrates a computing architecture 10 having a first control unit 12 and a second control unit 14, with each being respectively configured to control the operational behavior of an actuator 16. As will be explained below, the present computing architecture may be used in high fidelity control situations where accurate and continued operation of the actuator 16 is critical for the operation of a larger system. As such, the present computing architecture 10 may be a "fail-operational" architecture, where a fault or failure of one component (e.g., a control processor) does not render the greater system non-operational.

Each of the first and second control units 12, 14 may be embodied as an independent processing device that is physically separate from the other. By being physically separated, it is less likely that a hardware or software fault on one unit would affect the operational behavior of the other unit. Each control unit 12, 14 may include various hardware resources, such as one or more digital processing devices, volatile and/or non-volatile memory, analog and/or digital input/output (I/O) circuitry, and/or network communication circuitry that may cooperate to execute one or more algorithms or routines that may be embodied as software or firmware associated with the unit.

Each control unit 12, 14 may be configured to generate a respective actuator control signal 18, 20 that may be capable of controlling the behavior of the actuator 16. The generated control signals 18, 20 may be provided to an arbiter or switch 22, which may select one of the two control signals 18, 20 to provide to the actuator 16 as a master actuator control signal 24. The actuator 16 may include one or more motors, solenoids, power screws, pumps, or other such devices that may generate a mechanical output in response to the received (electrical) control signal 24.

Each control unit 12, 14 may generate its respective control signal 18, 20 in response to one or more sensory inputs 28 that may be provided to each control unit 18, 20. In one configuration, each sensory input 28 may be provided to each control unit 12, 14 along its own separate control line/signal bus (full redundancy). In another configuration, both control units 12, 14 may operate on sensory information provided along a common signal bus (partial redundancy). The sensory inputs 28 may include digital information provided from one or more position sensors, state sensors, pressure sensors, force sensors, temperature sensors, cameras, radar sensors, lidar sensors, or the like.

The first control unit 12 may be a high integrity device that may include a primary computing means, as well as various self-diagnostic and/or error checking means. "High-integrity" is intended to mean that the control unit 12 may provide an output with a high degree of certainty that the output is accurate. This accuracy may be provided through the self-diagnostic and/or error checking means that are included with the unit 12. Conversely, the second control unit 14 may be a lower integrity device that may include significantly reduced (or non-existent) diagnostic/error-checking capabilities.

As generally illustrated in FIG. 1, in one configuration, the first control unit 12 may include a primary processing device 30 and a diagnostic processing device 32. The primary processing device 30 may be configured to execute one or more software control algorithms to generate the first control signal 18 in response to the received sensory inputs 28. The software control algorithms may be embodied as software or firmware that are stored within memory local to the first control unit 12 and/or the primary processing device 30. The software control algorithms may include, for example, one or more motor control algorithms, lighting control algorithms, or hydraulic control algorithms.

The diagnostic processing device 32 may execute one or more diagnostic algorithms that may be operative to verify the first control signal 18 and/or one or more intermediate values used to generate the first control signal 18. For example, in one configuration, the diagnostic processing device 32 may continuously compute one or more analytical models of expected system or output behavior, given the provided actuation commands and history of the system. If the actual output or system behavior deviates from the computed analytical model by a predetermined amount, the processor may indicate that a fault condition exists, such as via a health status indicator 34. In general, the health status indicator 34 may be a digital status indicator that may be used to report out the occurrence of a fault condition within the primary processing device 30.

In one configuration, the primary processing device 30 and diagnostic processing device 32 may be embodied as distinct integrated circuits/processors provided within a common controller. As such, they may interact on a common bus, and may share certain memory and/or hardware resources, yet may maintain a certain level of physical independence. In another configuration, the primary processing device 30 and diagnostic processing device 32 may be included within a single integrated circuit/processor, though their respective functions/algorithms may be independently executed by separate processing cores within the integrated circuit.

As further illustrated in FIG. 1, in one configuration, the second control unit 14 may include a redundant processing device 40 that may be similar to the primary processing device 30 of the first control unit 12. The redundant processing device 40 may be configured to execute one or more software control algorithms to generate the second control signal 20 in response to the received sensory inputs 28. The software control algorithms may be embodied as software or firmware that are stored within memory local to the second control unit 14 and/or the redundant processing device 40.

In one configuration, the redundant processing device 40 may be identical to the primary processing device 30, and may include identical software algorithms to generate identical outputs using the same sensory inputs 28. In another configuration, the redundant processing device 40 may include similar software algorithms as in the primary processing device 30, but may be independently developed to avoid being strictly identical. In this manner, under normal operating conditions, the first control signal 18 and the second control signal 20 may have the same response behavior, and may be within a small tolerance of each other, but may not necessarily be coincident. As may be appreciated, including identical software may provide a hardware redundancy, but software design errors may not be caught. Using independently designed software provides both a hardware and software redundancy (i.e., if the software in the primary processing device 30 fails due to a design issue, it is unlikely that independently designed software would suffer the same failure at the same time).

Figure 2:
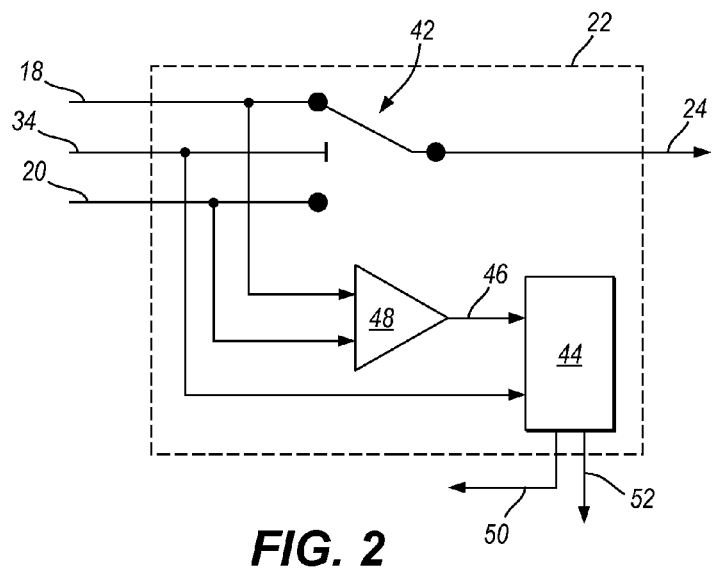
FIG. 2 is a schematic diagram of a switch for use with the architecture provided in FIG. 1.

The switch 22 may receive the first control signal 18, the second control signal 20, and the health status indicator 34, and may selectively provide one of the first and second control signals 18, 20 to the actuator 16 as the master control signal 24. FIG. 2 illustrates one configuration of the switch 22. As shown, the switch 22 may include a digital toggle 42 that may transition the master control signal 24 between the first control signal 18 and the second control signal 20 in response to the health status indicator 34. If the health status indicator 34 indicates that the first control unit 12 is fully operational and that no fault exists, the toggle 42 may use the first control signal 18 as the master control signal 24. If the health status indicator 34 indicates that a self-diagnosed fault has occurred within the first control unit 12, however, the toggle 42 may flip and use the second control signal 20 as the master control signal 24.

In addition to the digital toggle 42, the switch 22 may include a shutdown module 44 that may be configured to initiate a limited-operation mode and/or shutdown routine if a processing error is detected. The shutdown module 44 may receive the health status indicator 34 and an indication 46 of the absolute difference between the first control signal 18 and the second control signal 20 (such as from a comparator/differential amplifier 48). If either the health status indicator 34 indicates a fault or the absolute difference between the signals 18, 20 exceeds a threshold, the shutdown module 44 may determine that the system has lost its redundancy. In such an instance, the shutdown module 44 may provide a limited operation/shutdown signal 50 to each of the first and second control units 12, 14 and/or may provide a diagnostic indicator 52 to a diagnostic log (e.g., and On Board Diagnostic (OBD) log) or to a user (e.g., via a warning indicator/lamp).

Based on the two input signals to the shutdown module 44, four operational possibilities may exist:

First, if the health status indicator 34 is positive (i.e., no fault detected), and the signals 18, 20 from each control unit 12, 14 converge, then it may be presumed that both control units 12, 14 are operational and working correctly.

Second, if the health status indicator 34 is positive and the signals diverge, the first control unit 12 may be presumed to be operational, while the second control unit 14 may be diagnosed as failed. That is, the diagnostic processing device 32 may be presumed to correctly assess the health of the first control unit 12, while the divergence of signals may indicate that the second control unit 14 has incurred a fault or error.

Third, if, following a period of normal operation (i.e., the first case identified above), the health status indicator 34 turns negative (i.e., indicating a fault on the primary control unit 12), and the signals also diverge, the shutdown module 44 may infer that the second control unit 14 remains healthy, while the detected fault on the first control processing unit 12 caused the signal divergence. In this case, the toggle 42 may transition the master control signal 24 to use the second control signal 20.

Finally, in a fourth case, if the health status indicator 34 turns negative following a period of normal operation, though the signals still converge, the fault may be presumed to have occurred with the diagnostic processing device 32. As such, the shutdown module 44 may infer that the system has lost its ability to accurately assess the health of the computing architecture.

In any of the second, third, or fourth cases identified above, the shutdown module 44 may provide an indication 50 to the first and second control units 12, 14 to initiate a limited operation shutdown mode. In one configuration, the limited operation shutdown mode may be a reduced-capability and/or conservative mode of operation that seeks to maintain system stability and limited operation. In another configuration, it may be a full-functioned mode of operation that may merely terminate once the system has reached a stable operating state where the system can be safely powered down. For example, in an automotive vehicle, the present system may be used with a power steering module. If the computing architecture 10 were to indicate a fault and switch to the second control unit 14 while the vehicle is still in motion, a limited operation shutdown mode may include operating a steering actuator for a limited time until the vehicle is placed in a "key-off state" or into a "park" gear. Once either of these two stable operating states are achieved, the shutdown module 44 may disable further operation of the system or vehicle.

When the limited operation shutdown mode is initiated, the shutdown module 44 may also provide a warning indicator 52 to a user of the system. For example, in the case of an automotive vehicle, the warning indicator 52 may include an illuminated warning message provided on an instrument panel within the passenger compartment. The warning indicator 52 may alert the driver of the vehicle to the system failure, and may prompt the user to take precautionary measures, and/or to cease operation of the vehicle when such action is reasonably available.

While FIG. 1 generally illustrates the use of the computing architecture 10 to control only a single actuator, it may similarly be used to control a plurality of actuators that may perform similar or differing functions. For example, in one configuration, the overall system may employ at least one redundant actuation means in the event a fault occurs with the actuator 16. In such an instance, the computing architecture 10 may be used to control both the primary actuator 16 and the redundant actuator (not shown).

Figure 3:
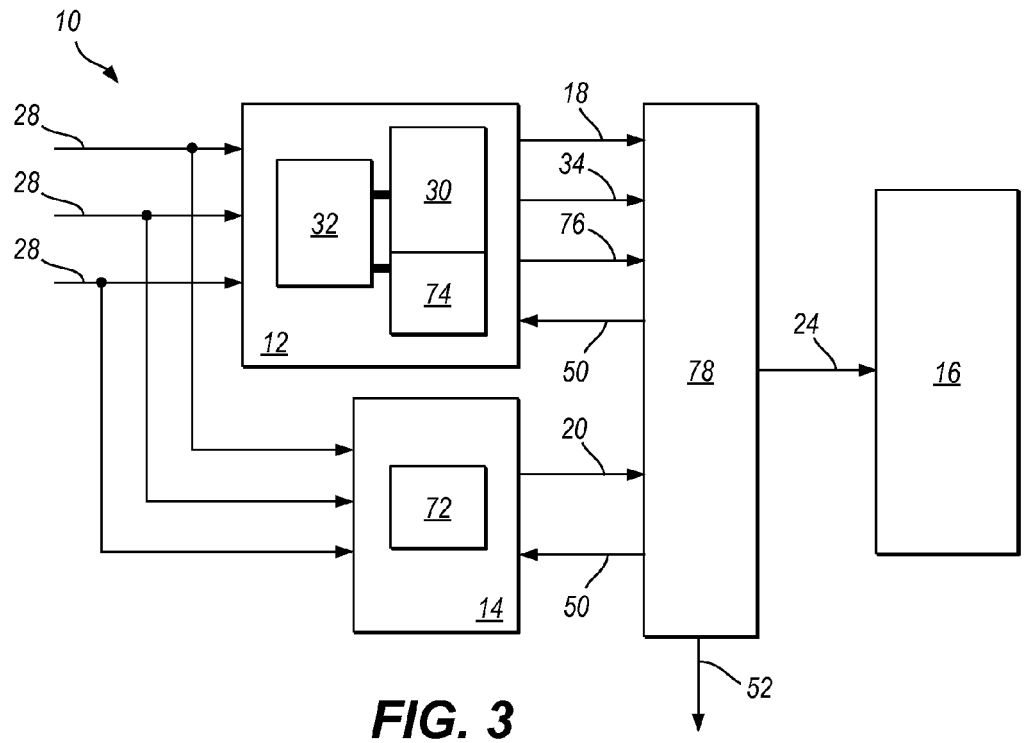
FIG. 3 is a schematic diagram of a second embodiment of a redundant computing architecture for controlling an actuator.

FIG. 3 illustrates another embodiment of a redundant computing architecture 70, and is generally similar to the architecture 10 illustrated in FIG. 1. The most notable difference between the architecture 70 in FIG. 3 and that provided in FIG. 1, is that FIG. 3 illustrates an embodiment where the second control unit 14 includes a redundant processing device 72 that has significantly reduced capabilities when compared with the primary processing device 30 provided with the first control unit 12. Due to the reduced capabilities and/or processing power, the differential amplifier 48 may flag signal divergences that are only attributable to the difference in processing capabilities, and are not necessarily indicative of a fault. Therefore, in the embodiment illustrated in FIG. 3, the first control unit 12 may include an additional processing device 74 that may be configured in a similar manner as the reduced-capability redundant processing device 72. This additional processing device 74 may be embodied by the same physical processor as the primary processing device 30, and may be subject to the diagnostic/error checking performed by the diagnostic processing device 32.

Figure 4:
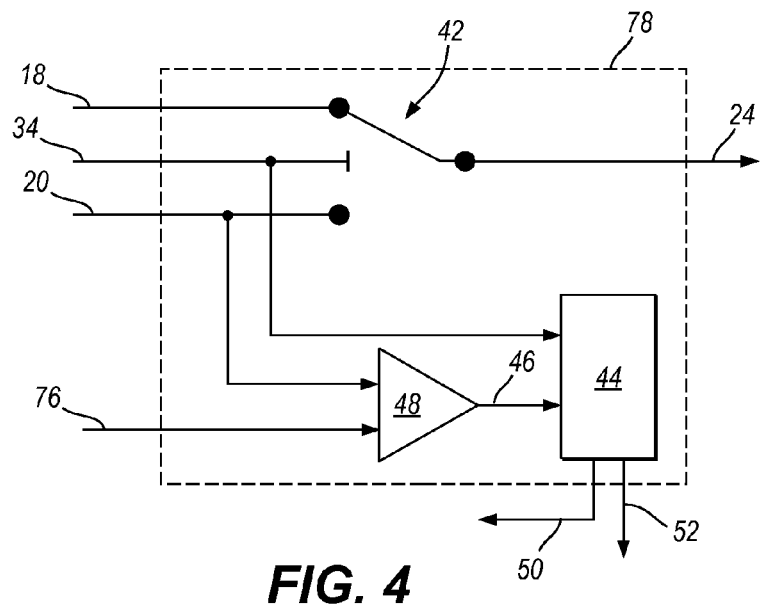
FIG. 4 is a schematic diagram of a switch for use with the architecture provided in FIG. 3.

The additional processing device 74 included with the first control unit 12 may output a control signal 76, which may be used solely for the purpose of comparing with the second control signal 20. FIG. 4 illustrates an embodiment of a switch 78 that may be used with the computing architecture 70 provided in FIG. 3. The switch 78 may operate in a similar manner as the switch 22 schematically provided in FIG. 2, except that the control signal 76 may be used for the purpose of convergence-testing, rather than using the first control signal 18.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A redundant computing architecture comprising:
 a first, primary, control unit configured to provide a first control signal having a first magnitude in response to a sensory input and to provide a health status indicator indicative of a fault condition within the first control unit, wherein the first control signal is configured to operate an actuator;
 a second, backup, control unit configured to provide a second control signal having a second magnitude in response to the sensory input, wherein the second control signal is configured to operate the actuator;
 a switch configured to receive the health status indicator, the first control signal, and second control signal;
 wherein the switch is configured to provide the first control signal to the actuator if the health status indicator does not indicate a fault within the first control unit;
 wherein the switch is configured to provide an indicator indicative of a fault within the first control unit and to provide the second control signal to the actuator if the health status indicator does indicate a fault within the first control unit;
 wherein the switch is configured to determine an absolute difference between the first magnitude and the second magnitude, compare the absolute difference to a threshold, and provide the indicator if the absolute difference exceeds the threshold;
 wherein the indicator includes a limited operation signal provided to each of the first control unit and the second control unit; and wherein the limited operation signal is configured to prevent further operation of both the first control unit and the second control unit following a predefined event.

2. The computing architecture of claim 1, wherein the predefined event includes placing the architecture in a stationary state or disabling the computing architecture.

3. The computing architecture of claim 1, wherein the indicator includes a warning light.

4. The computing architecture of claim 1, wherein the first control unit includes a first processing device and a diagnostic device, wherein the first processing device is configured to provide the first control signal in response to the sensory input, and wherein the diagnostic device is configured to provide the health status indicator in response to the operation of the first processing device.

5. The computing architecture of claim 4, wherein the health status indicator is indicative of a fault within the first processing device.

6. A redundant computing architecture comprising:
   a first control unit including:
      a first processing device configured to provide a first control signal having a first magnitude in response to a sensory input, wherein the first control signal is operative to control an actuator; and
      a diagnostic device configured to provide a health status indicator in response to the operation of the first processing device, wherein the health status indicator is indicative of a fault within the first processing device;
   a second control unit including a second processing device configured to provide a second control signal having a second magnitude in response to the sensory input, wherein the second control signal is operative to control the actuator;
   a switch configured to receive the health status indicator, the first control signal, and second control signal;
   wherein the switch is configured to determine an absolute difference between the first magnitude and the second magnitude, compare the absolute difference to a threshold, and provide an indicator if the absolute difference exceeds the threshold;
   wherein the switch is configured to provide the first control signal to the actuator if the health status indicator does not indicate a fault within the first control unit; and
   wherein the switch is configured to provide the second control signal to the actuator if the health status indicator does indicate a fault within the first control unit;
   wherein the switch is further configured to provide the indicator if the health status indicator indicates a fault within the first control unit;
   wherein the indicator includes a limited operation signal provided to each of the first control unit and the second control unit; and
   wherein the limited operation signal is configured to prevent further operation of both the first control unit and the second control unit following a predefined event.

7. The computing architecture of claim 6, wherein the predefined event includes placing the architecture in a stationary state or disabling the computing architecture.

8. The computing architecture of claim 6, wherein the indicator includes a warning light.

* * * * *